No. 614,400. Patented Nov. 15, 1898.
G. W. LEE, F. ELLIOTT & G. TATHAM.
COMPOSITION, PROCESS OF, AND APPARATUS FOR MAKING GAS.
(Application filed Dec. 23, 1897.)

(No Model.)

Witnesses
Inventors
George W. Lee
Frank Elliott
George Tatham
By James L. Norris
Atty.

UNITED STATES PATENT OFFICE.

GEORGE WASHINGTON LEE, FRANK ELLIOTT, AND GEORGE TATHAM, OF SYDNEY, NEW SOUTH WALES.

COMPOSITION, PROCESS OF, AND APPARATUS FOR MAKING GAS.

SPECIFICATION forming part of Letters Patent No. 614,400, dated November 15, 1898.

Application filed December 23, 1897. Serial No. 663,256. (No model.)

*To all whom it may concern:*

Be it known that we, GEORGE WASHINGTON LEE, agent, residing at Royal Hotel, George street, FRANK ELLIOTT, plumber, residing at 201 Kent street, and GEORGE TATHAM, engineer, residing at 50 Clarence street, Sydney, in the British Colony of New South Wales, subjects of the Queen of Great Britain, have invented a new and useful Process of and Apparatus for the Manufacture of Inflammable Gas and Composition to be Used Therein, of which the following is a specification.

This invention relates to the manufacture of inflammable gas for illuminating and heating purposes as well as for use as a source of motive power for driving gas-engines and the like.

The apparatus comprises two essential features—viz., a peculiarly-constructed air supplier and moistener or pump, and a generator so arranged as to automatically manufacture the gas only as it is required for consumption or storage.

The process consists in impregnating atmospheric air with as much aqueous moisture as it will hold and passing same through fine shavings saturated with a specially-prepared liquid composition contained in one or more small chambers in the generator.

The special composition consists of the three following ingredients, viz: $(C_2H_5)_2O$ "commercial sulfuric ether," citronella-oil, and water in the approximate relative proportions of one ounce of each of the first two to four ounces of water.

Figure 1:
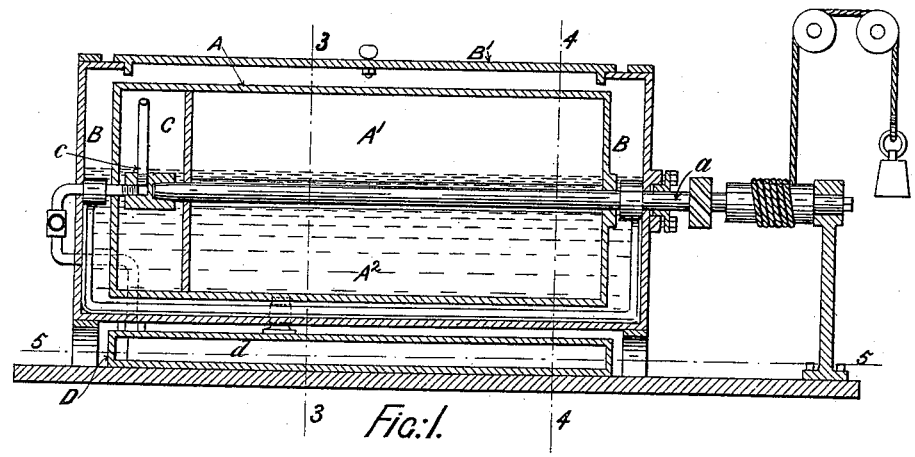
Figure 2:
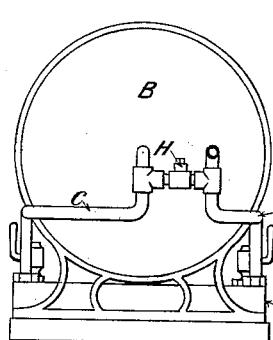
Figure 3:
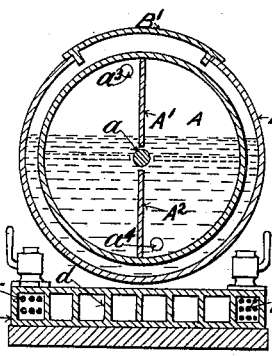
Figure 4:
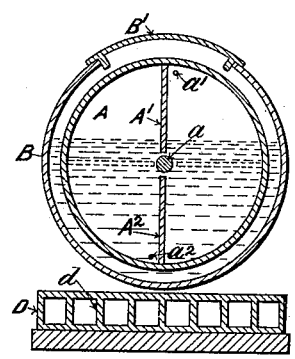
Figure 5:
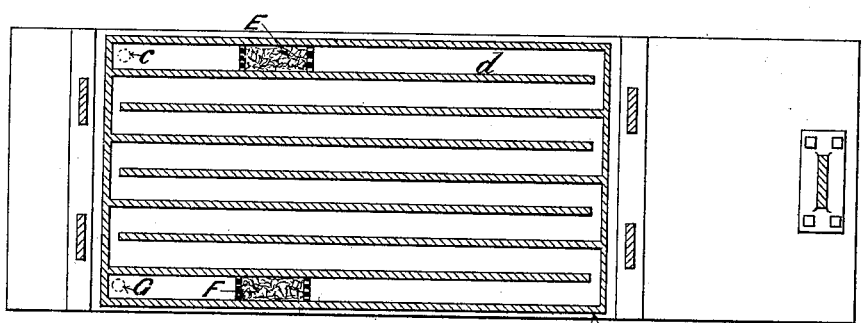

Referring to the accompanying drawings, Figure 1 represents a vertical longitudinal section; Fig. 2, an end view of the apparatus; Fig. 3, a transverse section on line 3 3, Fig. 1, looking toward the air-outlet end; Fig. 4, a similar view on line 4 4, Fig. 1, looking toward the air-inlet end, while Fig. 5 represents a horizontal section on line 5 5, Fig. 1.

The air supplier and moistener or pump consists, essentially, of a receiver A, preferably cylindrical, as shown, and mounted upon a rotatable spindle $a$, working in suitable bearings in a receptacle or trough B, containing water up to a few inches above the level of the spindle. Within the receiver A are two or more vanes $A'$ $A^2$, extending from the periphery to near the spindle, and in one end of said receiver are two or more air-inlet holes or orifices $a'$ $a^2$ and in the other end two or more air-outlet holes or orifices $a^3$ $a^4$, each of said pairs of holes being arranged diametrically opposite to each other on opposite sides of the vanes, as shown in the drawings.

It will be obvious that as the receiver A rotates air will be continuously admitted through the holes or orifices $a'$ $a^2$ and discharged through the holes or orifices $a^3$ $a^4$ by the resistance of the water, while at the same time said air will be rendered moist by its contact therewith, and consequently prevent loss by evaporation of the special composition in the chambers hereinafter mentioned. The stream of air from the outlet holes or orifices $a^3$ $a^4$ passes into an air-chamber C, partitioned off from the receiver A, and thence through a conduit-pipe $c$, projecting above the level of the water, into the generator D, which is provided, as shown, with a number of baffle-plates $d$, projecting alternately from either end so as to form a long tortuous or zigzag passage. At a point about where the air enters, or a short distance therefrom, is a small chamber E, containing fine wood shavings or the like, thoroughly saturated with the special composition hereinbefore mentioned, through which the air is passed, and after traveling along the several passages it enters another similar chamber F, containing the special composition, and is finally discharged into the main pipe G or led into a reservoir, as desired. In order that the stream of air may not pass through the composition-containing chambers E and F too quickly, the superficial area of the outlet-holes of said chambers should not be more than one-half of that of the inlet-holes, and, if preferred, only one composition-containing chamber may be employed.

In the drawings we have shown the apparatus as being driven by a suspended weight, although it is obvious that other sources of power may be used for the like purpose.

The trough or receptacle B is provided with a cover B', fitting over a manhole, through which the water may be introduced or the apparatus examined, and the composition-containing chambers E and F are provided with removable caps for recharging, or, if desired, cups may be fitted thereon for receiving constant replenishment by any well-known "dripping" or other apparatus, which forms no part of this invention.

The resultant gas is highly illuminant, and if intended for cooking purposes only should be mixed with air, in which case a by-pass and cock H may be provided between the air-supply pipe c and gas-discharging pipe G, or, if preferred, said gas may be burned in ordinary Bunsen burners.

Instead of employing only two vanes $A'A^2$ in the receiver A a larger number may be employed, if desired, as shown in dotted lines in Figs. 3 and 4, in which four such vanes are shown, two being in dotted lines arranged at right angles with those in full lines, in which case the number of air inlet and outlet orifices will be correspondingly increased.

In operation this apparatus after once full is entirely automatic and generates more gas only as it is required, for the reason that when one or more jets are turned on an escape is provided which creates a draft and allows the receiver A to rotate, whereas when there is no such escape the pressure within counterbalances the power of the weight or its equivalent without and stops the rotation.

Although it is generally preferred to employ the apparatus shown and described for carrying out the process, in cases where large municipalities are to be supplied from one gas-works it may be found desirable to charge a gas or air holder with atmospheric air in the ordinary way, then lead it, as required, under water and subsequently into contact with the special composition in the generating-chamber in a steady stream. The course of the air-currents is shown in Figs. 1 and 5 by arrows.

Having now particularly described and ascertained the nature of our said invention and in what manner the same is to be performed, we declare that what we claim is—

1. The process described for the manufacture of inflammable gas, consisting in first impregnating atmospheric air with aqueous moisture and then passing it through or over a special composition consisting of a mixture of commercial sulfuric ether, $(C_2H_5)_2O$, citronella-oil, and water, substantially as described.

2. In the manufacture of inflammable gas, the special composition described for the impregnation of moistened air, said composition consisting of commercial sulfuric ether, $(C_2H_5)_2O$, citronella-oil, and water, mingled in substantially the proportions specified.

3. An apparatus for the manufacture of inflammable gas, comprising a rotatable receiver having vanes extending from its wall to points near its axis, and having air-inlet openings in one end upon one side of the vanes and air-outlets in the other end separated from the inlet-openings by said vanes, an inclosing receptacle to contain water, a chamber at one end communicating with the receiver through the air-outlets, and a generator communicating with said chamber by a conduit-pipe, substantially as described.

4. In an apparatus for the manufacture of inflammable gas, the combination with a rotatable receiver having vanes extending from its wall to points near its axis and provided with air-inlets in one end and outlets in the other end separated from the inlets by the vanes, of an inclosing receptacle, a generator containing a tortuous passage, one end of which communicates by a conduit-pipe with a chamber in one end of the receiver with which the outlet-openings in one end of the latter communicate, a main pipe leading from the other end of said tortuous passage, of means for revolving the receiver, substantially as described.

5. In an apparatus for the manufacture of inflammable gas, the combination with a receiver mounted on a rotatable axis and inclosed in a trough or receptacle communicating with one end of the receiver by air-inlets which are separated from outlet-openings in the other end by vanes extending from the wall to points near the axis, a generator having a tortuous air-passage, one end of which communicates by a conduit-pipe with a chamber in one end of the receiver into which the outlet-openings discharge, a main pipe into which the tortuous air-passage discharges, said passage being provided near its ends with composition-containing chambers, and means for revolving said receiver, substantially as described.

Dated this 15th day of November, 1897.

GEORGE WASHINGTON LEE.
FRANK ELLIOTT.
GEORGE TATHAM.

Witnesses:
 FRED WALSH,
 PERCY NEWELL.